(12) United States Patent
Hofbeck et al.

(10) Patent No.: US 7,380,818 B2
(45) Date of Patent: Jun. 3, 2008

(54) DEVICE AND METHOD FOR DETECTING THE POSITION OF A PERSON ON A SEAT OF A MOTOR VEHICLE

(75) Inventors: Klaus Hofbeck, Neumarkt (DE); Thomas Klement, Regensburg (DE); Birgit Rösel, Regensburg (DE); Arnd Stielow, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 388 days.

(21) Appl. No.: 10/536,043

(22) PCT Filed: Oct. 17, 2003

(86) PCT No.: PCT/DE03/03454

§ 371 (c)(1),
(2), (4) Date: May 20, 2005

(87) PCT Pub. No.: WO2004/045913

PCT Pub. Date: Jun. 3, 2004

(65) Prior Publication Data

US 2005/0280556 A1  Dec. 22, 2005

(30) Foreign Application Priority Data

Nov. 20, 2002 (DE) .................. 102 54 201

(51) Int. Cl.
*B60R 21/015* (2006.01)

(52) U.S. Cl. ........................ 280/735; 701/45

(58) Field of Classification Search .................. 701/45; 455/66.1; 324/532–535, 637, 639, 642; 340/426.26, 340/551, 552, 5.2, 5.7, 5.72
See application file for complete search history.

(56) References Cited

U.S. PATENT DOCUMENTS

| | | | |
|---|---|---|---|
| 6,199,904 B1 | 3/2001 | Dosdall | |
| 6,279,946 B1* | 8/2001 | Johnson et al. | 280/735 |
| 6,462,701 B1 | 10/2002 | Finn | |
| 6,856,876 B2* | 2/2005 | Breed et al. | 701/47 |
| 6,942,248 B2* | 9/2005 | Breed et al. | 280/735 |
| 7,134,687 B2* | 11/2006 | Breed et al. | 280/735 |
| 7,243,945 B2* | 7/2007 | Breed et al. | 280/735 |
| 2002/0008615 A1 | 1/2002 | Heide et al. | |
| 2002/0140215 A1 | 10/2002 | Breed et al. | |
| 2006/0152347 A1* | 7/2006 | Hofbeck et al. | 340/425.5 |

FOREIGN PATENT DOCUMENTS

| | | |
|---|---|---|
| DE | 199 57 536 A1 | 6/2001 |
| DE | 199 57 557 A1 | 6/2001 |
| WO | 99/54175 | 10/1999 |
| WO | 01/94157 A1 | 12/2001 |

* cited by examiner

*Primary Examiner*—Eric Culbreth
*Assistant Examiner*—Barry Gooden, Jr.
(74) *Attorney, Agent, or Firm*—Laurence A. Greenberg; Werner H. Stemer; Ralph E. Locher

(57) ABSTRACT

Disclosed is a device comprising a transceiver (9) which transmits HF signals that are reflected back by means of reflectors (6) located in the seats. Diagnostic reflectors (10) are disposed at the edge of the seats in order to diagnose the reflectors (6). Said diagnostic reflectors (10) are disposed such that the diagnostic reflectors are normally not covered up by a person (1) sitting on a seat (2). The diagnosis is carried out at the same time as the person is identified.

9 Claims, 1 Drawing Sheet

DEVICE AND METHOD FOR DETECTING THE POSITION OF A PERSON ON A SEAT OF A MOTOR VEHICLE

BACKGROUND OF THE INVENTION

FIELD OF THE INVENTION

The invention relates to a device and method for detecting the position of a person on a seat of a motor vehicle in order, for example, depending on the position, to control the release of the airbag in the event of an accident.

A known device (U.S. Pat. No. 6,199,904 B1) has a transceiver comprising an HF transmitter (high-frequency transmitter) and an HF receiver. The transmitter transmits HF beams to a vehicle seat which has a reflecting surface. The beams are reflected by the surface and transferred to the receiver. The receiver receives the reflected signals and evaluates the intensity of the received signals. If a person sits down on a seat, then the signals are damped significantly by the body, so it can then immediately be detected that a person is located on the seat.

It was proposed within the company that a transceiver from an access control and vehicle starting system be used as the transceiver. Using this, the distance between transceiver and reflector can be determined from the transit time of the signals. The signals reflected by the reflector can then be distinguished from other scatter signals using knowledge of the location and position of the seat, and, from the intensities of the received signals, it can be established with certainty whether a person is seated on a seat.

A transceiver is already generally known for an anti-theft system of a motor vehicle (DE 199 57 536 A1), in which the position of an encoder (which serves as a modulating reflector) is determined. Only if the position is permissible and the code authorized is access to the motor vehicle cleared or an immobilizer released.

It was also proposed by the company that backscatter systems be used as reflectors, in which systems the reflected signals are modulated by means of a code. Such backscatter systems are known, for example, from patent DE 199 57 557 A1, which has been laid open to public inspection. Here, the backscatter systems consist of surface-wave elements which have internally variably modulating reflectors. As a consequence of reflection at defined locations, a signal is furnished with a code by the reflectors and is sent back.

In the known devices for detecting the position of a person on a seat of a motor vehicle there is the disadvantage that it cannot be detected whether a person has sat down on the vehicle seat or whether the person is merely positioned leaning forwards or sitting diagonally on the seat. Only the intensity of the received signals is used, i.e. use is made only of damping upon passage of the beam through a human body. Signals which have been scattered or reflected several times cannot be detected as such. Nor can it be distinguished whether the received signal is being reflected by the seat or by another object.

SUMMARY OF THE INVENTION

The object of the invention is to establish a device and a method for detecting the position of a person on a seat of a motor vehicle, wherein a diagnosis can also be carried out of the correct functioning of the device.

This object is achieved according to the invention in a device for detecting the position of a person on a seat of a motor vehicle comprising the features of Claim 1 and Claim 7 and in a method comprising the features of Claim 9.

The device has an HF transmitter which is disposed in the passenger space and emits HF signals. One or more reflectors are disposed in one vehicle seat in each case. The reflectors reflect the received HF signals back to an HF receiver. The HF receiver evaluates from the signal transit time of the signals and/or the code contained in the HF signals whether a seat is occupied. In addition, the precise position of a person located on the seat can be detected (whether and to what extent the person is leaning forwards or sitting to one side).

For the purpose of diagnosing the device, one or more diagnostic reflectors are disposed in the seat. The diagnostic reflectors are disposed on the edge of each seat such that the reflectors are as far as possible not covered by the body of a person so that the HF signal arrives at the diagnostic reflector largely undamped and the reflection back to the HF receiver arrives there largely undamped.

This device has the advantage that it detects independently and with certainty whether one of the normal reflectors has failed, if a signal is received which was reflected back by a diagnostic reflector. A simple diagnosis of the device itself is thus possible. The diagnostic reflectors can be constructed in the same technology as the other reflectors. No adaption, calibration or gauging is needed for the reflectors. The diagnostic reflectors can be of a small, light and robust construction. The device can be used not only to detect persons on a seat but also whether or not other objects are located on the seat.

In place of the reflectors, HF transmitters or HF receivers can also be disposed in the seats, unidirectional transmission then occurring between HF transmitter and HF receiver. Diagnostic transmitters or diagnostic receivers are then likewise disposed in the seats. These can be used for a diagnosis of the device.

The method can be used to carry out simultaneously both a diagnosis and a detection of the position of a person on a seat. It can be determined by means of the diagnosis whether the device is still operating properly, since a diagnostic signal should ultimately always be received and evaluated by the diagnostic reflectors, diagnostic transmitters or diagnostic receivers.

Advantageous embodiments of the invention will emerge from the subclaims.

The diagnostic reflectors are disposed at the edge of a seat such that as undamped as possible a connection exists between transmitter, reflector and receiver and such that the diagnostic reflectors are connected to the reflectors wirelessly or via wires. The diagnostic reflector is advantageously disposed on a front face of the back rest, on a front face of the seat base of the vehicle seat or in the side of the head rest. With the HF transmitter which emits the HF signals positioned appropriately, if the diagnostic reflectors are positioned on the edges, the transmission paths to the diagnostic reflector are not covered or are only partially covered by the body of a person on the vehicle seat so the HF signals can be transmitted directly and undamped from the HF transmitter to the diagnostic reflector and transmitted back from there by means of reflection or scattering.

The reflectors and the diagnostic reflectors can transmit back the HF signals modulated with a code. By this means it can unambiguously be detected from which reflector the received signal originates. The actual position of the reflector can be determined from the signal transit time (the actual position depends among other things on the position of the seat and the inclination of the back rest). It can also be checked whether the received signal has taken a detour, i.e. as a result of multiple reflection, on its path from the transmitter via the reflector to the receiver.

The HF transmitter and the HF receiver are advantageously fashioned as one part, namely as a so-called transceiver. The transceiver can also be used for an access control and vehicle starting system (anti-theft system) which is already in place, since HF signals are also emitted and received there and the distance/position of an encoder determined with the aid of a transit time measurement. Such an anti-theft system is described with its elements by way of example in patent DE 199 57 536 A1, which has been laid open to public inspection. Detailed knowledge of such an anti-theft system is therefore assumed to be known to one skilled in the art.

The diagnostic reflectors are electrically connected in series or in parallel to the other reflectors via a switch, for example a transistor which is controlled as a switch. In this way, the diagnostic reflector can at any time be operated simultaneously with the reflectors or just in a diagnostic mode in order to detect whether any signals which were transmitted back by the diagnostic reflectors are received by the transceiver.

Since the diagnostic reflectors receive the HF signals largely undamped, during diagnosis their intensity upon emission can be reduced to the extent that less radiation is emitted in the direction of the seat and consequently in the direction of a person. If the diagnostic reflector is switched in series with the normal reflector, then it can immediately be detected even in normal operation whether the device has failed, if signals are received which can be attributed to the diagnostic reflector.

The diagnostic reflector can also serve as a test point in order to determine for example the actual current position of the seat. The position determined can then be forwarded to a different system in the vehicle, for example to an airbag system. The determined position of the person can also be supplied to other control equipment by means of which convenience functions (customized adjustment of the seats, adjustment of the mirrors, etc.) in the vehicle are controlled.

The diagnostic reflector can be fashioned as a modulating reflector, whereby a received signal is transmitted back, for example with the aid of a surface-wave element, modulated with a code. Other options for modulated reflection of the HF signal are also possible.

The HF receiver is advantageously used to determine the current position of a person on the vehicle seat and to forward this position to an airbag system, by which means release of the airbag can be controlled in the event of an accident. As an airbag system is a safety-critical system for a person, it is important that the sensors and reflectors function correctly, can be checked at any time and must not fail. Such safety is ensured through diagnosis with the diagnostic reflectors.

BRIEF DESCRIPTION OF THE DRAWING

Exemplary embodiments of the invention are explained in detail below with reference to the schematic drawings, in which.

DESCRIPTION OF THE PREFERRED EMBODIMENT

Figure 1:
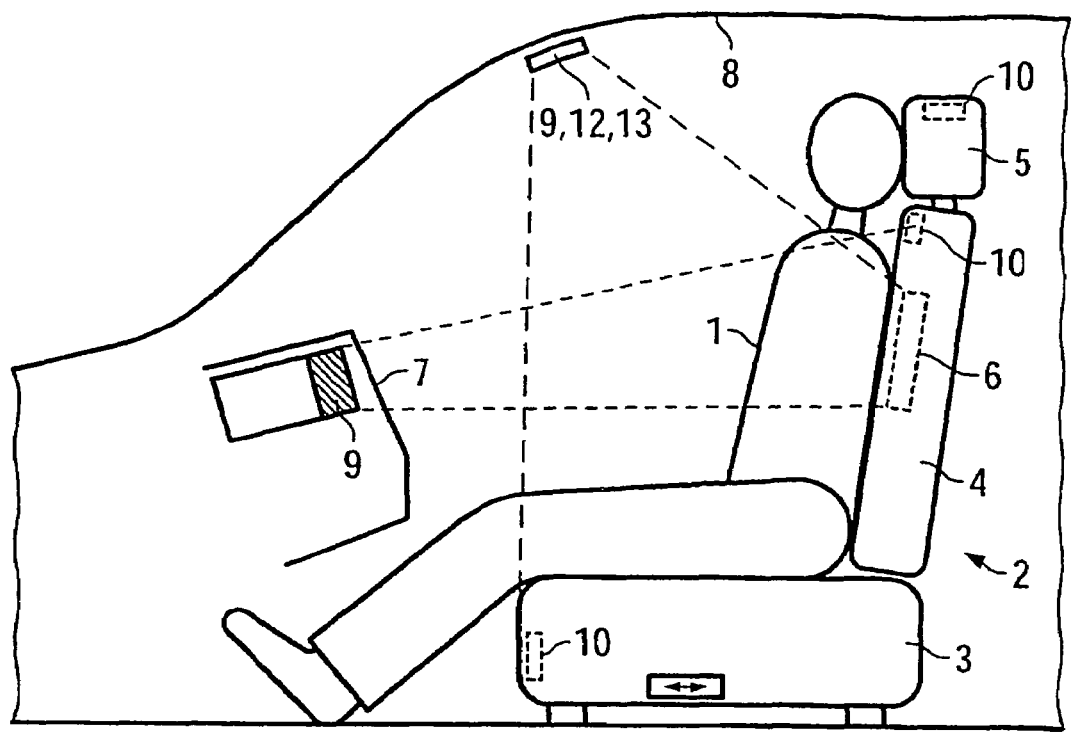
FIG. 1 shows a side view of a vehicle seat with a position located thereon with a device according to the invention and FIG. 2 shows a top view of a vehicle seat with a device according to FIG. 1

A device for detecting the position of a person 1 (FIG. 1) on a seat 2 of a motor vehicle has a vehicle seat 2 comprising a seat base 3, a back rest 4 and a head rest 5. Reflectors 6 are disposed in this seat 2 in areas in which a person 1 usually touches the seat 2 when seated. Transceivers 9 comprising an HF transmitter and an HF receiver can be located in the dashboard 7, in the central console, in the roof 8 and/or in the rear-view mirror. HF signals are emitted by the HF transmitters in the direction of the vehicle seat 2. These signals are reflected by reflectors 6 in the seats directly or modulated with a code. The HF receivers receive the signals and evaluate these using the received intensity, the signal transit time and/or the code contained in the signal.

If a person 1 or a bulky object is located on a seat 2, then these generally cover the reflectors 6 at least partially. HF transmitters/HF receivers and reflectors 6 are disposed such that the direct transmission path between them normally passes through a person 1 on the seat 2. The HF signals which are emitted by the HF transmitters therefore penetrate the body and in doing so are damped.

The signals reflected back by the reflectors 6 also pass at least partially through the body of the person 1 and are likewise damped. The signals consequently reach the HF receivers heavily damped. From the intensity, the transit time measurement and/or the code reflected back it can then be determined precisely whether a person 1 is located on the seat 2 and in what position the person is located. With the aid of the code and/or the transit time measurement, other signals which have reached the receiver by means of multiple reflections can be ignored in the evaluation.

In order to make it possible to carry out a self-diagnosis of the device, diagnostic reflectors 10 are disposed at the edge of the seats 2. These diagnostic reflectors 10 are disposed in areas at the edge of a seat 2, to be precise where the human body of a person 1 located on the vehicle seat 2 as far as possible does not cover the diagnostic reflectors 10, i.e. the transmission path between HF transmitter/receiver and diagnostic reflector 10 does not pass through the body and [transmission] is therefore not damped.

Figure 2:
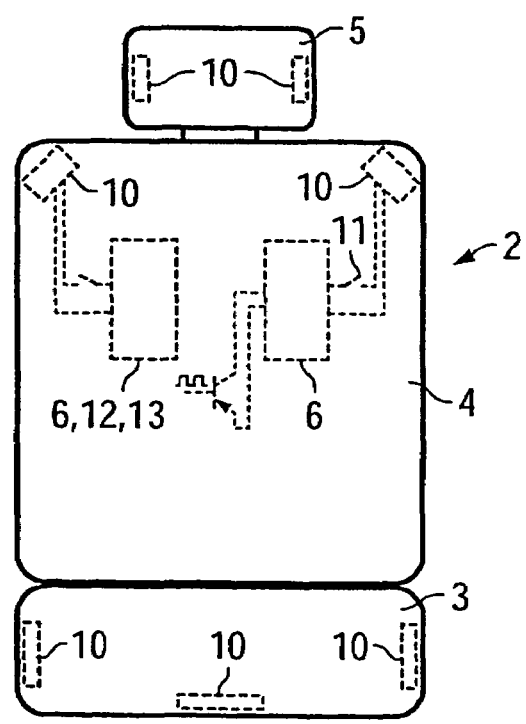

The diagnostic reflectors 10 can for example be disposed at the edge of each seat 2 in the region of the neck or lower leg of a person 1 located on the seat 2. Accordingly, the diagnostic reflectors 10 are disposed, as shown in FIG. 2 for example, in the top corners of the back rest 4 or to the front left or front right of the seat base 3 or of the front face of the seat base 3. In these areas, the transmission paths are usually not "obscured" by the bodies of persons while seated.

It is advantageous to arrange two diagnostic reflectors 10 symmetrically in the left-hand and right-hand corners of the back rest or to the left and right of the face of the seat base 3. In this way, at least one diagnostic reflector 10 will still be exposed to HF signals if the person 1 is located to one side of the seat 2.

The diagnostic reflectors 10 can be connected to the reflectors 6 via a switch 11 which is fashioned for example as a transistor. In normal operating mode, the diagnostic reflectors 10 can be additionally switched. Since they normally receive the HF signals undamped and the reflections of said HF signals also pass largely undamped back to the HF receivers, it can be established whether any relevant signal is being received. If this is not the case, then it is probable that all the reflectors 6, including the diagnostic reflectors 10, have failed, for example because the voltage supply in the seat 2 is interrupted, or that all the reflectors 6, including the diagnostic reflectors 10, are completely covered by a person 1 or an object.

It is advantageous to fashion the diagnostic reflectors 10, like the normal reflectors 6, as modulating reflectors 6,10 using the same technology. The reflectors 6 can thus transmit back the received signals in modulated form at a frequency of 10 kHz, while the diagnostic reflectors 10 transmit the signals back in modulated form at a frequency of 20 kHz.

Each diagnostic reflector 10 can also have its own code which is then transmitted back to the HF receiver. It can be established by this means at which of the diagnostic reflectors 10 a signal was reflected in modulated form. Even if signals are received which were previously reflected many times by reflectors 6 and other objects in the motor vehicle, the signals can be uniquely assigned to a diagnostic reflector 10 by means of the intensity and/or the signal transit time and/or the code.

Backscatters, as they are known, can be used as reflectors 6, 10. Distinctions are drawn here between a passive backscatter, a semipassive backscatter, a semiactive backscatter and an active backscatter.

A passive backscatter has a reflecting surface. By means of an $\epsilon_R$ step change (step change in the relative dielectric constant $\epsilon_R$) or change in the electrical conductivity, the intrinsic impedance exhibits a step change. A constant backscatter cross-section exists, so that no modulation occurs (like a mirror).

A semipassive backscatter also has a reflecting surface. However, there is a time-variable backscatter cross-section (e.g. through a switching transistor), but no signal amplification or signal generation takes place in the reflection process.

The semiactive backscatter is similar to the semipassive backscatter, but exhibits amplification of the signal to be reflected.

In the case of an active backscatter, the signal to be reflected is generated in the backscatter. To this end, the active backscatter has its own oscillator through which a phase-coherent signal is radiated back.

This device according to the invention can detect independently and with certainty whether a normal reflector 6 has failed. The diagnostic reflectors 10 can always be connected up so that a diagnosis of the device is carried out simultaneously with normal operation. Time windows can also be provided for the diagnosis, in which time windows only the diagnosis is then carried out.

The diagnostic reflectors 10 are supplied with energy via the normal reflectors 6. During operation it can then be detected from the received signal (code, signal transit time and/or intensity) whether there is a fault. If the reflectors 6 in the seat 2 are not supplied with energy in the event of a power failure, then no signal is reflected, not even by a diagnostic reflector 10.

The diagnostic reflector 10 is positioned on or in the seat 2 such that it is as far as possible not covered or largely not covered by a sitting person 1. Such a diagnostic reflector 10 can be fashioned simply and have small dimensions so that it can be disposed at any random point, preferably in the face of the back rest 4 or seat base 3, on the head rest 5 or at the edge of the vehicle seat 2.

Since the signals are transmitted directly to and fro between the transceiver 9 and the diagnostic reflector 10, the precise position of the seat 2 can be determined with the aid of a transit time measurement. As the signals are strongly damped when they pass through a human body, diffraction effects can even be utilized to detect a forward-shifted position of a person 1. As a result of the diffraction of the signals/radiation, a portion, though a reduced portion, of the signals still reaches the reflector 6 in slightly damped form. The angle of inclination or forward shift of the person 1 can be determined from the intensity of the reflected signal.

This positional information can be made available to other systems in the motor vehicle. Such other systems can for example include an airbag system, a seat adjustment system which is tailored to the individual settings of a user, a mirror adjustment system, etc.

If semipassive backscatters are used, then only very little current is consumed by the reflectors 6 including the diagnostic reflectors 10 (less than 1 μA). The diagnosis times are also very short and lie for example in the millisecond range. It is possible with these diagnostic reflectors 10 to operate in diagnostic mode and in normal operating mode simultaneously, i.e. to detect the position of a person 1 on a seat 2, since the HF signal reflected by the diagnostic reflector 10 can be unambiguously identified as such using the diagnostic reflector's own code or else (as a reference value) the predefined signal transit time between reflector 6 and transceiver 9 and is accordingly available for evaluation.

The HF signals are preferably emitted at a carrier frequency of 2.4 GHz. Of course, other frequencies in the HF range (433 MHz or 868 MHz) or microwave range (24 GHz) can also be used and emitted at such an intensity as to be non-injurious to humans.

HF transmitter and receiver do not necessarily have to be disposed at one location or in a shared housing. What is important is that the HF receiver receives reflected HF signals and forwards these to an internal evaluation unit which then performs a diagnosis of the device or determines the position of a person 1 on a vehicle seat 2.

In place of the reflectors 6, it is possible to use only a unidirectional transmission for detecting a seat position or for the diagnosis. Then, either an HF transmitter 12 or an HF receiver 13 is located in the seat 2, while the complementary component is disposed in the vehicle such that under normal conditions the transmission path passes through a body seated on a seat 2. Diagnostic transmitters or diagnostic receivers are then disposed at the edge such that the transmission path is clear under normal conditions. In terms of evaluation of the signal, these devices function precisely like the devices with reflector 6 and diagnostic reflector 10.

Diagnosis is deemed to refer to the detection of a fault, such as for example a power failure or a line interruption in the components in the seat only when the device is working perfectly can further use be made of the evaluated results for appropriate control purposes.

In the device according to the invention, the transmitted signals, which are transmitted through a body on a seat 2 damped or undamped from an HF transmitter 12 to an HF receiver (and possibly influenced by a reflector 6), are evaluated with regard to the codes contained in them and/or their signal transit time and/or possibly their intensity. It is possible by this means to detect a person 1 or a bulky object on a seat 2 (preferably front seats of a motor vehicle). By means of elements (diagnostic reflector 10 or HF transmitter 12/HF receiver 13) disposed at the edge of the seats, a diagnosis of the device is carried out, since through these elements the signal transit time, the code or the intensity of the signals transmitted by these changes compared with signals where no diagnosis is carried out.

The position of the reflectors 6 or of transmitter or receiver in the seat 2 is chosen such that the HF signal transmission path between transceiver 9 and reflector 6 or between transmitter and receiver is, as far as possible, covered by the body of a person 1 located on the seat 2 (in order that the person on the seat 2 can be detected). The diagnostic reflectors 10, by contrast, are positioned in the seat 2 such that the HF signal transmission path is, as far as possible, clear.

We claim:

1. A device for detecting a position of a person on a seat of a motor vehicle, the device comprising:
    at least one HF transmitter disposed in a passenger space of the motor vehicle and emitting HF signals;
    at least one reflector disposed inside the seat for reflecting the HF signals;
    at least one diagnostic reflector connected to said reflector disposed inside the seat; and
    an HF receiver for receiving the HF signals and carrying out a fault diagnosis from a signal transit time between emitting and receiving and/or from a code contained in a received HF signal;
    said diagnostic reflector assisting in the fault diagnosis.

2. The device according to claim 1, wherein said diagnostic reflector is disposed at an edge of the seat such that as undamped as possible a connection exists between said HF transmitter, said reflector and said HF receiver, and said diagnostic reflector is connected wirelessly or via wires.

3. The device according to claim 1, further comprising a common housing containing said HF transmitter and said HF receiver and forms a transceiver which at a same time constitutes a transceiver for an access control and vehicle starting system.

4. The device according to claim 1, wherein said diagnostic reflector is disposed on a front face of a back rest of the seat, on a front face of a seat base of the seat or on a side face of a head rest.

5. The device according to claim 1, wherein said diagnostic reflector is a modulating reflector for sending back a received signal modulated with a code.

6. The device according to claim 1, wherein said HF receiver is a part of an airbag system having an airbag, whereby a release of the airbag is dependent on a detected position of the person on the seat.

7. A device for detecting a position of a person on a seat of a motor vehicle, the device comprising:
    at least one HF transmitter disposed in one of a passenger space of the motor vehicle and the seat;
    at least one HF receiver disposed in the seat or in the passenger space vice versa of said HF transmitter, said HF transmitter emitting HF signals received and evaluated by said HF receiver with regard to a signal transit time between emitting and receiving and/or from a code contained in a received HF signal; and
    at least one diagnostic device, selected from the group consisting of diagnostic transmitters and diagnostic receivers, connected to said HF transmitter or said HF receiver;
    said diagnostic device diagnosing whether a device fault has occurred.

8. The device according to claim 7, wherein said diagnostic device is disposed at an edge of the seat such that a largely undamped direct communication link exists between said HF transmitter and said HF receiver, and such that said HF transmitter or said HF receiver in the motor vehicle and said HF transmitter or said HF receiver in the seat are disposed such that the communication link is damped by a human body.

9. A device for detecting a position of a person on a seat of a motor vehicle, the device comprising:
    an HF transmitter emitting signals;
    a reflector directly or indirectly reflecting the signals and disposed inside the seat; and
    an HF receiver receiving the signals being received signals, the person on the seat being detected from the received signals by a signal transit time and/or a code contained in the received signals and/or a received intensity, and wherein simultaneously with a detection of the person, a diagnosis for faults being carried out on said HF transmitter, said HF receiver or said reflector by recording and evaluating signal transit times, received signal intensities and/or received codes.

* * * * *